May 14, 1940.   A. DI TULLIO   2,200,239
SEPARABLE FASTENER
Filed Jan. 25, 1939

INVENTOR.
Ambroise Di Tullio
BY Kelley & Chisholm
ATTORNEYS.

Patented May 14, 1940

2,200,239

UNITED STATES PATENT OFFICE 2,200,239

SEPARABLE FASTENER

Ambroise Di Tullio, Petit, Quevilly, France, assignor to Talon, Inc., a corporation of Pennsylvania Application January 25, 1939, Serial No. 252,795
In Great Britain February 4, 1938

4 Claims. (Cl. 24—205)

This invention relates to sliding clasp fasteners of the kind comprising two flexible stringers having fastener members mounted thereon, and adapted to be engaged and disengaged by the action of a slider. More particularly the invention is concerned with fasteners of the completely separable type and with separable end fittings therefor.

The usual type of separable end fitting for completely separable fasteners comprises cooperating pin and socket members mounted respectively at the ends of the two stringers and on the adjoining edges thereof. To effect engagement of the pin and socket members, the slider is moved to the fully open position in which it makes contact with the socket member and the pin member is then inserted through the slider channel into the socket member.

With the aforesaid known type of separable end fitting, by reason of the necessity of inserting the pin member through the slider channel and by reason of the mounting of the pin and socket members on the adjoining edges of the stringers, the width of the pin and socket members is limited by the size of the fastener members and by the dimensions of the slider. Particularly in the manufacture of fasteners having members of small dimensions such limitation in the size of the separable end fitting is undesirable. Thus for example, when working with certain constructional materials difficulty may be experienced in attaining adequate strength, and in any event, it may not be possible readily and quickly to thread the pin member through the slider into engagement with the socket member.

It is the principal object of this invention to provide open-end or separable fittings which can be made of any desired dimensions irrespective of the dimensions of the slider and of the fastener members, and which can be manipulated easily and quickly.

A further object is to provide a separable end fitting of plastic material which is sturdy in construction.

In accordance with the present invention the pin member is offset laterally with respect to the fastener members on the corresponding stringer so that it may be engaged directly with the socket member without previous insertion through the slider channel. In this way, the pin member may be made of any desired dimensions irrespective of the dimensions of the fastener members and of the slider.

Figure 1:
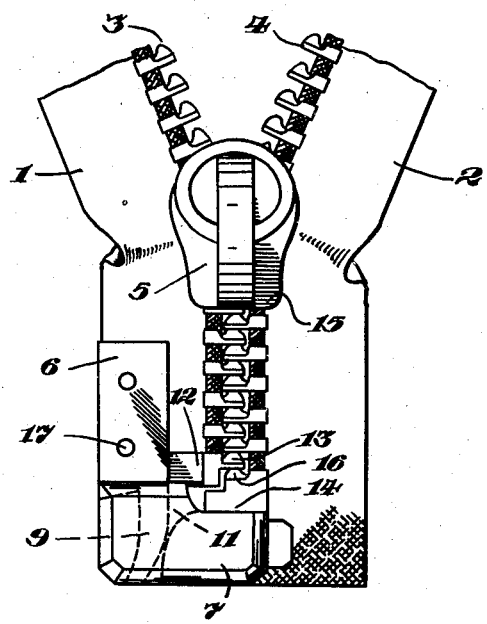
Figure 2:
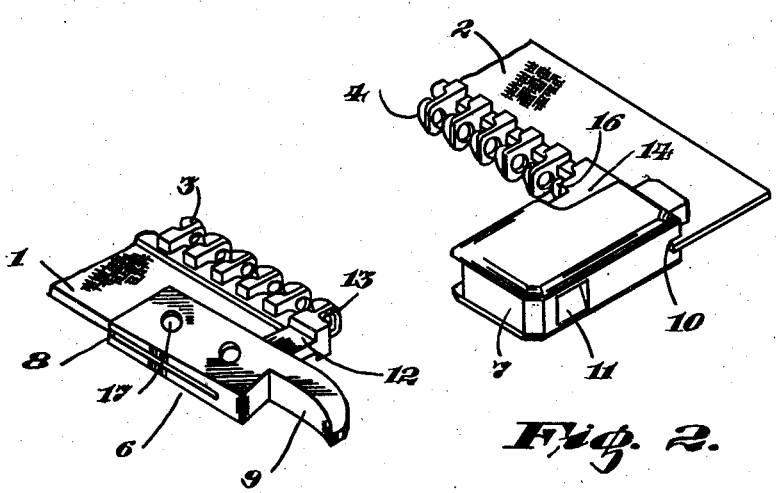

One convenient embodiment of the invention is illustrated by way of example only, in the accompanying drawing, in which:

Fig. 1 is a plan view of a separable end fitting in accordance with the invention; and Fig. 2 is a perspective view of the fastener showing the two parts of the separable end fitting separated from each other.

Referring to the drawing, the numerals 1, 2 designate the fabric mounting tapes upon one edge of which are mounted a row of closely and accurately spaced fastener members 3, 4, respectively, adapted to be engaged and disengaged by means of a slider 5. The fastener members may be made of any desired suitable material, for example, a plastic material. The separable end fitting comprises a pin member 6 adapted to be received at its lower end within a socket member 7 mounted on the opposite stringer.

The pin member 6 is mounted on the outside edge of the mounting tape 1, that is, the edge remote from the fastener members 3. The mounting of the member 6 may conveniently be done by providing this member with a laterally extending slot 8 (Fig. 2) in which the edge of the tape is inserted and to which it is secured in any convenient manner. It will thus be seen that the lower or engaging portion 9 of the pin member 6 is offset laterally with respect to the fastener members 3.

The socket member 7 is mounted on the inside edge of the fabric tape 2 in any convenient fashion, as by means of a groove 10 in which the edge of the tape 2 is secured. The socket member extends laterally in the direction of the tape 1 and is provided with a socket-like aperture 11 of suitable shape to accommodate the lower end 9 of the pin member 6. The pin member 6 and the socket member 7 may, for example, be made of plastic material (preferably by a molding process) and may then be secured to the mounting tapes by any of the known methods. While the members may be secured to the tapes simultaneously with the fastener members, they are preferably attached subsequently.

It is convenient when using plastic material, to provide the pin member 6 with a laterally extending portion 12 formed with a complete fastener member 13 at its end, which fastener member 13 forms the first of the series of members on the tapes 1. The small extension 12 which is passed through the slider channel may provide a reinforcing or guiding effect facilitating correct and easy engagement of the pin member with the socket member. The socket member 7 has a slight cut-away portion 14 shaped at its edge to correspond with the shape of the lower end 15 of the upper wing of the slider, the said lower end 15 being received, in the fully open position, in the cut-away portion 14.

The member 7 is also provided with an extension 16, preferably formed integrally therewith, which constitutes the first fastener member of the series and is therefore provided with a projection but not with a recess. Holes 17 may be formed in the pin member 6 for attachment of that member to a garment or other article to which the fastener is to be applied.

It will be understood that the present invention renders it possible to apply separable end fittings to fasteners of which the fastener members may be of extremely small dimensions without attendant disadvantages of difficulty in manipulation. Furthermore, the invention is particularly applicable to fasteners made of plastic materials and permits of the engaging portions of the open-end fittings being made of dimensions necessary for adequate strength. The separable end fitting may be made in any desired manner depending to some extent on the nature of the material to be employed, although in the case of plastic material a molding or casting process is in most cases preferred.

While I have shown and described in this application, one embodiment which my invention may assume in practice, it will be understood that this embodiment is merely for the purposes of illustration, and that various other forms may be devised within the scope of my invention as defined in the appended claims.

What I claim as my invention is:

1. In a slide fastener including two stringers having fastener elements on their adjacent edges, and a slider mounted on the elements to open and close the fastener; a separable end connection for the stringers comprising a socket member attached to one stringer at its inner edge, and a pin member attached to the opposite stringer at its outer edge, said socket member extending laterally from its stringer beyond the path of the slider body, and a socket in the extension of said socket member beyond said path, adapted to receive said pin to make the connection for the ends of the fastener stringers to one side of the path of the slider.

2. A slide fastener separable end connection as defined in claim 1 in which the pin member which is located to one side of the path of the slider has a lateral extension toward the edge of its stringer to stiffen the end of the stringer.

3. A slide fastener separable end connection as defined in claim 1 in which said pin member has a lug extending therefrom, said lug being shaped to form the lowermost fastener element on the same stringer.

4. In a slide fastener including two stringers having fastener elements on their adjacent edges, and a slider mounted on the elements to open and close the fastener; a separable end connection for the stringers comprising a socket member attached to one stringer at its inner edge, the socket portion of which extends so far enough beyond the stringer that the socket is beyond the path of movement of the slider, and a member attached to the outer edge of the other stringer cooperating with the socket to hold the stringers together, said member having a pin portion engageable with the socket outwardly of the path of movement of the slider and an upward extension extending parallel to the fastener elements and spaced therefrom a sufficient distance to enable free movement of the slider between the fastener elements and extension.

AMBROISE DI TULLIO.